United States Patent

Manero

[15] 3,686,739
[45] Aug. 29, 1972

[54] INTERMEDIATE CLUTCH ALIGNMENT TOOL

[72] Inventor: Anthony Frank Manero, 10918 Modena Place, Philadelphia, Pa. 19154

[22] Filed: Sept. 28, 1970

[21] Appl. No.: 76,104

[52] U.S. Cl. ..........................29/274, 269/1, 269/40
[51] Int. Cl. ..........B23p 19/04, B25b 1/20, B25j 1/00
[58] Field of Search ......................29/274; 269/1, 40

[56] References Cited

UNITED STATES PATENTS

| | | | |
|---|---|---|---|
| 1,986,156 | 1/1935 | Nelson | 29/274 |
| 2,348,920 | 5/1944 | Ott | 269/40 |
| 2,044,818 | 6/1936 | Spase | 29/274 X |
| 2,445,755 | 7/1948 | Bannon | 269/40 X |
| 2,487,504 | 11/1949 | Yelkin | 29/274 |
| 3,099,875 | 8/1963 | Lelis | 29/274 X |

*Primary Examiner*—Wayne A. Morse, Jr.
*Attorney*—Karl L. Spivak

[57] ABSTRACT

An intermediate clutch alignment tool for use in assembling automatic transmissions including a hollow, cylindrical body overfitting the center support and a plurality of alignment arms radially extending from the periphery of the body, each said arm terminating outwardly in a longitudinally aligned groove for receiving and aligning a plurality of individual clutch plates.

3 Claims, 5 Drawing Figures

INVENTOR.
ANTHONY F. MANERO

BY *[signature]*

ATTORNEY.

INTERMEDIATE CLUTCH ALIGNMENT TOOL

BACKGROUND OF THE INVENTION

The present invention relates generally to the field of auto mechanics and more particularly, is directed to a tool and method for reinstalling a plurality of intermediate clutch plates when rebuilding an automatic transmission.

The use of automatic transmissions in automobiles has become firmly established to such an extent that a majority of automobiles now produced are equipped with such transmissions. The automatic transmissions presently in use are quite reliable and have gained almost universal acceptance by the purchasing public. Even though design refinements and improved manufacturing standards over the past several years have resulted in the design and production of automatic transmissions having increased periods of useful life, due to the conditions of wear upon use and in view of the number of moving parts employed in the design of automatic transmissions, it is quite often necessary to repair and rebuild automatic transmissions after extended periods of use. Many skilled mechanics have been trained and automatic transmission specialty shops have been developed to repair and recondition used automatic transmissions to thereby provide many additional years of satisfactory service.

These trained automobile mechanics and automatic transmission specialty shops have developed skilled techniques to permit them to speedily and reliably disassemble and assemble the complicated automatic transmission machinery in order to repair or replace defective parts. In reassembling types of automatic transmissions of different manufacture, for example the "Hydramatic" transmission as manufactured by General Motors Corporation, these skilled workers have encountered difficulty in reinstalling the plurality of intermediate clutch plates. Such transmissions employ a clutch pack comprising a plurality of individual clutch plates which must be precisely aligned upon a center support during the transmission rebuilding operation. Because of the unique position of these clutch plates and the manner in which they are designed to be installed, precise aligning has always proved difficult both because of the design and because of the relatively inaccessible position of these parts. Prior workers in the field, no matter how skilled, often find difficulty in properly aligning the clutch plates during the reassembly process. It is normally simply a matter of feel and sometimes luck until the plates fall into the proper position, and the skill of the mechanic usually does not affect the time consumed by this operation. Because of these difficulties, skilled men can sometimes be held up as long as an hour in attempting to precisely align the intermediate clutch plates during the mechanical reassembly of parts. No amount of training or skill can aid in this reassembly and a worker simply must keep trying until the parts fall into properly aligned position for reassembly. Until the present invention was developed, no tool or other mechanical aid was available to the repairman to aid in the reassembly of the intermediate clutch plates.

SUMMARY OF THE INVENTION

The present invention discloses an intermediate clutch alignment tool for use by automatic transmission repairman in reassembling the intermediate clutch plates during a transmission rebuilding process.

The intermediate clutch alignment tool includes a hollow, cylindrical body suitable for positioning upon the center support. The body is provided with a plurality of radially extending arms which each terminate outwardly in a longitudinally aligned groove to receive and align the internal ridges of the respective intermediate clutch plates thereon. The alignment tool serves to automatically and positively align all of the individual clutch plates to thereby take all chance and manipulation out of reinstalling the clutch pack assembly. An air lock fitting is supplied with the invention to apply air pressure to the piston to thereby lock the clutch plates in position after alignment and thus permit removal of the alignment tool.

It is therefore an object of the present invention to provide an improved intermediate clutch alignment tool of the type set forth.

It is another object of the present invention to provide a novel intermediate clutch alignment tool capable of functioning with existing equipment to automatically and positively align intermediate clutch plates when reassembling an automatic transmission.

It is another object of the present invention to provide a novel intermediate clutch alignment tool and auxiliary air lock which cooperate with existing automatic transmission parts to position and properly align intermediate clutch plates in an automatic transmission assembly.

It is another object of the present invention to provide a novel intermediate clutch alignment tool incorporating intermediate clutch plate aligning means.

It is another object of the present invention to provide a novel intermediate clutch alignment tool including radially positioned, longitudinally aligned grooves for aligning cooperation with the internal spline construction provided on a plurality of individual clutch plates.

It is another object of the present invention to provide a novel intermediate clutch alignment tool and means to readily remove the tool following the intermediate clutch plate aligning procedures.

It is another object of the present invention to provide a novel intermediate clutch alignment tool that is inexpensive in manufacture, rugged in construction and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3 is a cross sectional view taken along Line 3—3 of FIG. 2, looking in the direction of the arrows.

FIG. 4 is a partial, side elevational view of the parts of FIG. 2, partially in section and partially broken away to expose interior construction and showing the initial arrangement of the aligned parts.

FIG. 5 is a view similar to FIG. 4 showing the intermediate clutch plates locked in position upon movement of the piston.

DESCRIPTION OF THE PREFERRED EMBODIMENT OF THE INVENTION

Figure 1:
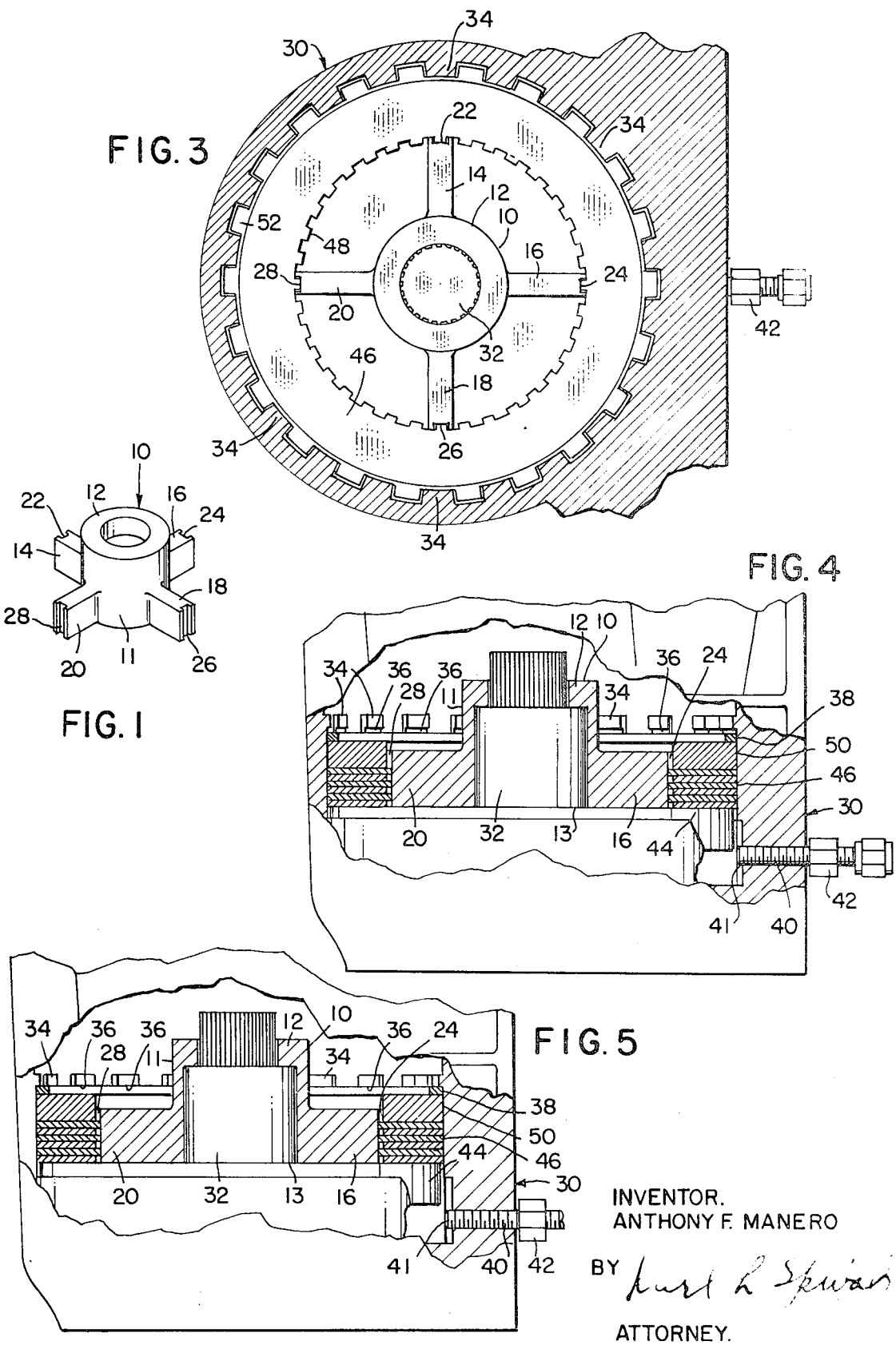
FIG. 1 is a perspective view of the alignment tool for use in aligning intermediate clutch plates within an automatic transmission to be reassembled.

Although specific terms are used in the following description for the sake of clarity, these terms are intended to refer only to the particular structure selected for illustration in the drawings and are not intended to define or limit the scope of the invention.

Referring now to the drawings, I show in FIG. 1 an intermediate clutch alignment tool 10 comprising a hollow, cylindrical body 11 and a plurality of peripherally spaced, integral arms 14, 16, 18, 20 which radially extend from the outer periphery of the body 11. If desired, the body 11 may terminate upwardly in an inwardly extending collar 12 to closely overfit the center support 32. Each arm terminates outwardly in a longitudinally aligned, peripherally spaced groove 22, 24, 26, 28 for aligning the various intermediate clutch plates upon reassembling an automatic transmission as hereinafter more fully set forth.

Figure 2:
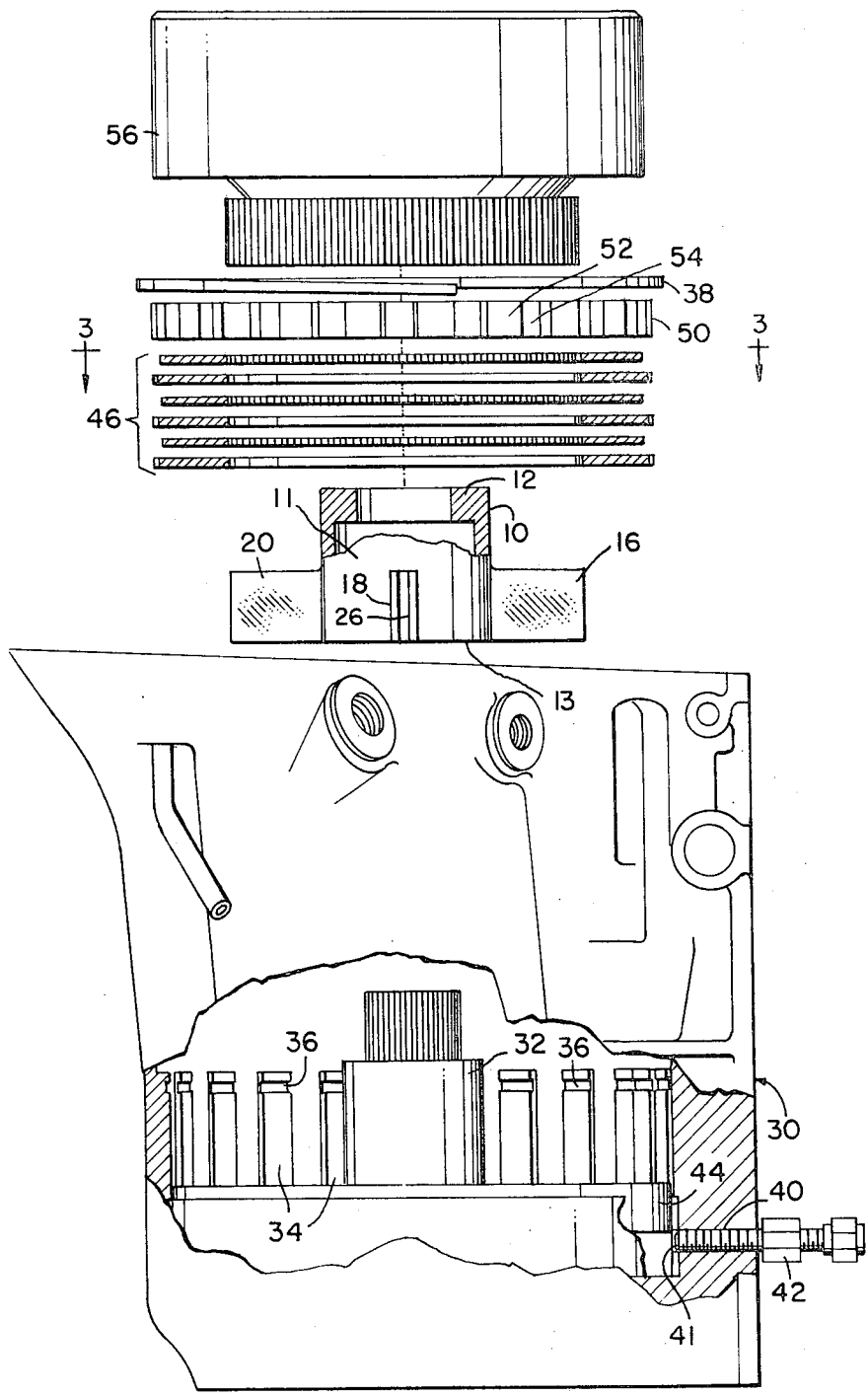
FIG. 2 is an exploded, side elevational view of a portion of an automatic transmission and intermediate clutch assembly prior to reinstallation and partially broken away to expose internal construction.

Referring now to FIG. 2, I show an automatic transmission casing 30 with the usual center support 32 positioned therein and extending in parallel alignment with the longitudinal axis of the transmission. The casing 30 is provided with a plurality of radially positioned inwardly projecting, positioning splines 34 in the usual manner. Each spline 34 is provided near its upper terminus with an aligned transverse groove 36 for receipt and retainment of the snap ring 38 as hereinafter more fully set forth. An air lock adaptor fitting 40 threadedly turns into the existing threaded locating bolt opening 41 provided to usually receive the center support locating bolt and terminates exteriorly of the casing 30 in any suitable air hose connection 42 such as the usual male and female quick snap connection. The air supplied through the air lock adaptor fitting 40 activates the piston 44 which is housed within the center support 32 for intermediate clutch plate securing purposes as hereinafter more fully set forth.

The clutch alignment tool 10 overfits the center support 32 with the body 11 aligned over the center support and the bottom 13 resting upon the surface of the piston 44. The plurality of intermediate clutch plates 46 position within the casing 30 over the center support 32. Each clutch plate 46 is provided with a plurality of radially spaced, inwardly projecting splines 48 which cooperate with the respective grooves 22, 24, 26, 28 provided at the outer termini of the clutch alignment tool arms 14, 16, 18, 20. The respective grooves 22, 24, 26, 28 are sized and peripherally positioned to receive the respective intermediate clutch plate splines 48 therein for alignment purposes. As best seen in FIG. 3, all of the plurality of intermediate clutch plates 46 overfit the center support 32 and each plate 46 has its respective splines 48 aligned within the aligning grooves 22, 24, 26, 28 provided in the respective radially extending arms 14, 16, 18, 20. In this manner, the tool 10 serves to positively align a plurality of intermediate clutch plates 46 upon the respective grooves 22, 24, 26, 28. A backing plate 50 of conventional design is provided with a plurality of longitudinally extending splines 52 and grooves 54 in the usual manner which are machined to precisely fit and cooperate with the plurality of casing splines 34, also in well-known manner.

With the intermediate clutch plates 46 positioned within the casing 30 over the center support 32 and aligned upon the clutch alignment tool 10, the backing plate 50 then overfits the clutch plate pack 46 with the respective splines 52 and grooves 54 positioned in aligned cooperation with the casing splines 34. The snap ring 38 is then positioned within the transverse casing groove 36 to lock the backing plate 50 and the plurality of intermediate clutch plates 46 in position within the casing in the usual manner. The clutch alignment tool 10 may be rotated upon the center support slightly as required to assure proper alignment of the plurality of intermediate clutch plates 46 upon the aligning grooves 22, 24, 26, 28.

With the parts in properly aligned position, an air pressure hose of conventional design (not shown) then connects to the air lock adaptor connection 42 in the usual manner to thereby apply air pressure to the undersurface of the piston 44. See FIG. 4. The energization of the piston 44 under air pressure forces the intermediate clutch plates 46 and the backing plate 50 to force against the groove 36 retained snap ring 38 in properly aligned relation. With air pressure applied, the intermediate clutch plates 46 lock in properly aligned position. The intermediate clutch alignment tool 10 can then be simply removed from the assembly by pulling outwardly from the locked plates 46 inasmuch as it has served its aligning purposes.

Once the clutch alignment tool 10 has been removed and with air pressure still applied at the undersurface of the piston 44, the direct clutch drum, forward clutch drum and front pump assembly 56 then installs in the usual manner to lock the previously aligned intermediate clutch plates 46 in the desired position. After installing the direct clutch drum, forward clutch drum and front pump assembly 56, air pressure can then be removed and the air lock adaptor fitting 40 can be removed from the center support locating bolt opening 41. With the intermediate clutch plates 46 thus aligned and installed in position, the remainder of the transmission may be rebuilt in the usual manner.

I claim:

1. In an intermediate clutch alignment tool for aligning a plurality of intermediate clutch plates upon the center support of an automatic transmission, wherein the clutch plates are provided with internal aligning splines, the combination of
   A. a hollow cylindrical body having an outer periphery,
      1. said body having suitable diameter to closely overfit the said center support;
   B. a plurality of equally spaced aligning arms connected to the said body and radially extending from the outer periphery thereof,
      1. said aligning arms terminating outwardly in clutch plate aligning means,
         a. said clutch plate aligning means including grooves provided in the outer termini of the aligning arms, b. said grooves receiving the intermediate clutch plate aligning splines therein for aligning purposes.

2. The invention of claim 1 wherein the aligning arms position about the body in angular relationship of 90° from the next adjacent arm.

3. The invention of claim 2 wherein the body has a central axis and wherein the said grooves align with and are spaced from the said central axis.

* * * * *